(12) United States Patent
Haner

(10) Patent No.: US 9,999,991 B2
(45) Date of Patent: Jun. 19, 2018

(54) ATTACHABLE REFLECTOR

(71) Applicant: KRONES AG, Neutraubling (DE)

(72) Inventor: Arno Haner, Wiesent (DE)

(73) Assignee: KRONES AG (DE)

( * ) Notice: Subject to any disclaimer, the term of this patent is extended or adjusted under 35 U.S.C. 154(b) by 199 days.

(21) Appl. No.: 14/832,203

(22) Filed: Aug. 21, 2015

(65) Prior Publication Data

US 2016/0052174 A1    Feb. 25, 2016

(30) Foreign Application Priority Data

Aug. 21, 2014 (DE) .................. 10 2014 111 949

(51) Int. Cl.
| | |
|---|---|
| *B29B 13/02* | (2006.01) |
| *B29C 49/68* | (2006.01) |
| *B29B 13/08* | (2006.01) |
| *B29C 49/64* | (2006.01) |
| *B29C 49/06* | (2006.01) |
| *B29C 35/08* | (2006.01) |
| *B29L 31/00* | (2006.01) |

(52) U.S. Cl.
CPC ............ *B29B 13/02* (2013.01); *B29B 13/024* (2013.01); *B29B 13/08* (2013.01); *B29C 49/64* (2013.01); *B29C 49/68* (2013.01); *B29C 49/06* (2013.01); *B29C 49/6418* (2013.01); *B29C 2035/0822* (2013.01); *B29L 2031/7158* (2013.01)

(58) Field of Classification Search
CPC ........ B29B 13/02; B29B 13/024; B29C 49/64
See application file for complete search history.

(56) References Cited

U.S. PATENT DOCUMENTS

| | | | | |
|---|---|---|---|---|
| 5,549,468 A | * | 8/1996 | Mitchell ............... | B29B 13/024 |
| | | | | 219/388 |
| 6,361,301 B1 | * | 3/2002 | Scaglotti ............. | B29C 49/6445 |
| | | | | 264/454 |

(Continued)

FOREIGN PATENT DOCUMENTS

| | | | | |
|---|---|---|---|---|
| DE | 10 2006 028 702 | | 6/2009 | ............... G21K 5/04 |
| DE | 10 2010 049 136 | | 4/2012 | ............. B29C 49/68 |

(Continued)

OTHER PUBLICATIONS

European Search Report for corresponding European Patent Application Serial No. 15181944.8-1706, dated Jan. 27, 2016 (8 pages).

(Continued)

*Primary Examiner* — Alison L Hindenlang
*Assistant Examiner* — Cedrick S Williams
(74) *Attorney, Agent, or Firm* — Hayes Soloway P.C.

(57) ABSTRACT

Apparatus for heating plastic parisons, with a transport device which transports the plastic parisons along a predetermined transport path, and with at least one heating device, wherein the heating device has at least one first radiation source which emits thermal radiation as well as at least one reflector device which reflects at least a proportion of the thermal radiation emitted by the radiation source in the direction of the plastic parisons. The reflector device can be attached to the radiation source and has a support and a reflection component which bears against the support on at least one region and is suitable for reflection of the radiation.

16 Claims, 1 Drawing Sheet

(56) References Cited

U.S. PATENT DOCUMENTS

| | | | |
|---|---|---|---|
| 8,278,603 B2 | 10/2012 | Deyerl et al. | 219/385 |
| 2009/0184267 A1 | 7/2009 | Bär et al. | 250/504 R |
| 2010/0200560 A1* | 8/2010 | Deyerl | B29B 13/024 |
| | | | 219/385 |
| 2012/0267357 A1* | 10/2012 | Monteix | B29B 13/024 |
| | | | 219/411 |
| 2012/0267832 A1* | 10/2012 | Zocher | B29B 13/023 |
| | | | 264/458 |
| 2014/0270733 A1 | 9/2014 | Schoenberber et al. | 392/411 |

FOREIGN PATENT DOCUMENTS

| | | | |
|---|---|---|---|
| EP | 0999724 | 5/2000 | F21V 29/02 |
| EP | 2 110 225 | 10/2009 | B29C 49/64 |
| EP | 2216161 | 8/2010 | B29B 13/02 |
| EP | 2682243 | 1/2014 | B29B 31/02 |
| EP | 2682243 A1 * | 8/2014 | B29C 49/68 |
| FR | 2942740 | 9/2010 | B29C 49/68 |
| WO | WO 2011/006483 | 1/2011 | B29B 13/02 |

OTHER PUBLICATIONS

German Search Report issued in corresponding German Patent Appln. No. 10 2014 111 949.5 dated Jul. 30, 2015 (5 pgs).

* cited by examiner

ATTACHABLE REFLECTOR

BACKGROUND OF THE INVENTION

The present invention relates to an apparatus for heating plastic containers, in particular plastic parisons. It is known from the prior art that so-called plastic parisons, in particular made of PET, are initially heated in a kiln and then in the context of a blow moulding process, in particular a stretch blow moulding process, are transformed or expanded into plastic containers with a desired final form. Infrared radiators are often employed as heating elements.

In order to increase the efficiency of heating by the radiation used, the use of reflectors is known from the prior art. For this purpose these reflectors are disposed in such a way that they reflect radiation which is not travelling towards the plastic parison in the direction of the plastic parison to be heated. By means of the use of reflectors it is not only possible to increase the overall efficiency of the heating apparatus, but also to be able to differentiate more precisely in a targeted manner between individual regions of the plastic parison with regard to the required temperature regulation.

For the subsequent successful and efficient progress of the stretch blow-moulding process it may be very important in the heating apparatus to apply increased radiation in a targeted manner to individual regions of the plastic parison, but attenuated radiation is merely applied to other regions. Thus for example the plastic parisons conventionally have a mouth region which is open at the top, is usually formed as an external thread and already in the course of the production of the plastic parisons acquires the shape of the mouth region of the finished container. Thus precisely this region should not be expanded and thereby deformed during the blow moulding process. For this purpose it is necessary as far as possible to omit the mouth region of the plastic parison from the application of radiation in the heating system.

Reflectors are known from the prior art in which the radiation emitted by the heating elements can be focused by the specific curvature of the reflecting surface of the reflectors. A heating system for heating parisons is known from DE 10 2010 049 136 A1, in which a back reflector is provided which has an exposed area or groove in order to be able to be disposed as close as possible to the IR radiator. A lamp device for heating parisons for the production of containers, which device has a reflector curved in the shape of an arc of a circle, is known from EP 2 110 225 A1. Moreover, coated radiation sources are known.

From an as yet unpublished patent application a heating system is known which has a reflector device with a first section with a substantially parabolically curved configuration and a second section with a curved configuration of which the curvature differs from the curvature of the first section.

Moreover, lens radiators or parabolic radiators are known, of which the glass tubes with a circular or elliptical cross-section are modified in such a way that a large part of their inner shell surface is provided with a reflective coating.

From the prior art it has been shown disadvantageously that separately installed reflectors, which are therefore distanced from the radiation source, require a large installation space due to their great distance from the radiation source and the large installation width which is necessary as a result. On the other hand, coated radiators always have a round cross-section. The object of the present invention therefore is to design a heating system for a plastic parison by which a reduction of the installation space is achieved.

SUMMARY OF THE INVENTION

An apparatus according to the invention for heating plastic parisons has a transport device which transports the plastic parisons along a predetermined transport path. Furthermore the apparatus has at least one heating device, wherein the heating device has at least one first radiation source which emits thermal radiation as well as at least one reflector device which reflects at least a proportion of the thermal radiation emitted by the radiation source in the direction of the plastic parisons.

According to the invention the reflector device can be attached to the radiation source and/or at least one radiation source mounting of the radiation source and has a support and a reflection component which bears against the support on at least one region and is suitable for reflection of the radiation.

Preferably the reflection component of the reflector device is disposed in such a way with respect to the radiation source and/or the plastic parisons or the transport path thereof that radiation components reflected by this reflection component reach the plastic parisons directly. It is significant here that at least a part of the radiation emitted by the radiation source impinges in a straight line on the reflection component.

In this case a reflector device which can be attached to the radiation source or a radiation source mounting is understood to mean that the reflector device is for example attached once only to a desired radiation source or radiation source mounting and then remains fixed on this radiation source or radiation source mounting. However, the attachable reflector device can also be attached several times to the same or also to different radiation sources or radiation source mountings and removed again. In this case the attachable reflector device can be attached directly to the radiation source, which means in particular that the reflector device bears against or is fastened to at least one contact region on the radiation source.

Thus an apparatus for heating plastic parisons is proposed, in which the reflector device can be or is attached to the radiation source, and is not distanced from the radiation source such as for example in the prior art.

The reflector devices are preferably configured in such a way that they are suitable for attachment to the standard radiation sources. Standard radiation sources are radiation sources which are conventionally used in the context of heating of plastic parisons. As a result apparatus having such standard radiation sources can be retrofitted with reflector devices according to the invention.

Thus the reflector device according to the invention constitutes a component of the heating apparatus which is separate from the radiation source and which can be disposed nearer to the radiation source by comparison with the distanced reflector device according to the prior art.

Preferably the reflection component and the support are not made of the same material but of different materials. In this case the support material preferably has a high heat resistance.

The reflection component preferably has very good reflection properties. Due to the design of the cross-sectional profile of the reflection component, that is to say the reflective surface, the radiation can be specifically oriented, concentrated or focused. The reflection component is preferably generated by a coating of at least one region of the support. Particularly preferably, therefore, the reflection component is provided by a coating with gold and/or ceramic or a treated surface, for example a polished surface.

Since the reflector device can be attached directly to the radiation source, the reflection component is located close to the radiation source. As a result a high level of efficiency is achieved. For a reflection component which is located at a greater distance from the radiation source, a larger reflective surface is necessary in order to be able to cover the same solid angle with respect to reflective radiation as a reflection component at a smaller distance. On the one hand this results in lower material costs, and on the other hand with the reflector device according to the invention a smaller installation space is necessary by comparison with reflector devices of similar cross-sectional profile which are distanced from the radiation source. Therefore by comparison with the prior art more radiation sources with respectively suitable reflector devices can preferably be disposed in a heater box.

Moreover, the apparatus according to the invention constitutes a cost-effective means for achieving the object in so far as a bar profile can preferably be used.

Furthermore, in the described reflector device it is possible to dispense with a separate cooling system, whereas for example in the prior art in the case of aluminium reflectors an air and/or water cooling system is necessary.

Preferably the radiation sources principally emit infrared radiation. However, radiation sources can also be employed of which the emitted radiation advantageously includes proportions in the near infrared range (NIR) and/or proportions in the far infrared range (FIR).

Elongate, bar-shaped radiation sources are conventionally used in the heating sources. The direction distinguished by this elongate shape of the radiation sources is designated as the longitudinal direction. The longitudinal direction preferably corresponds to the transport direction of the plastic parisons.

In a preferred embodiment the reflection component has a predetermined cross-section which deviates from a cross-section in the shape of a circular ring segment in a plane perpendicular to a longitudinal direction of the radiation source. As a result due to a suitable configuration of the cross-sectional profile of the reflection component a special focusing of the reflected radiation and/or a decrease in the energy density of the reflected radiation in specific areas is made possible. In this case the cross-sectional profile of the reflection component and in particular the resulting curvature of the reflective surface thereof in contrast to the prior art can be selected independently of the cross-sectional shape of the radiation source. Thus for example reflector devices with straight reflective sections can be attached to the conventional bar-shaped radiation sources with a circular cross-section. In this way not only is a space-saving construction made possible, as the reflection component is located very close to the radiation source, but also a wide variety of different cross-sectional profiles or curvatures of the reflection components are also enabled.

In a further advantageous embodiment the surface of the reflection component facing the radiation source is constructed in such a way that it follows a parabolically curved configuration at least in sections. The parabolically curved configuration preferably lies in a plane perpendicular to the transport direction of the plastic parisons. The plastic parisons are preferably vertical when transported, that is to say with their mouth at the top. Thus the attachable reflector device is preferably configured at least in some sections as a parabolic reflector.

In a further advantageous embodiment the surface of the reflection component facing the radiation source is constructed in such a way that it follows an elliptically curved configuration at least in sections. The elliptically curved configuration preferably lies in a plane perpendicular to the transport direction of the plastic parisons. Thus the attachable reflector device is preferably configured at least in some sections as an elliptical reflector.

In a further advantageous embodiment the radiation source is disposed in a focal point of the reflector device. In such an arrangement the radiation emitted by the radiation source and impinging on a reflection component with parabolically curved configuration is reflected uniformly in the direction of the plastic parison. If the radiation source is located in a focal point of a reflection component having an elliptically curved configuration, the reflected radiation can be focused in a targeted manner into a point on the wall of the plastic parison which is located at the second focal point of the elliptical configuration.

In a further advantageous embodiment the reflector device can be placed on the radiation source by pushing it on laterally in the longitudinal direction and/or fitting it on perpendicular to the longitudinal direction of the radiation source and/or by adhesion, preferably with heat-resistant adhesive.

In this way previously used or conventional radiation sources can be retrofitted if required and/or reflector devices can be replaced by other reflector devices with for example another cross-sectional profile of the reflection component. Moreover the configuration of the reflector device according to the invention has the advantage that the radiation sources can be replaced, for instance if they are defective, and the reflector devices can be reused.

The reflector device can preferably be attached to the radiation source in such a way that in the attached state it exhibits one or two degrees of freedom of movement, and for example is rotatable about the longitudinal axis of the radiation source and/or is movable along the longitudinal axis. This enables adjustment at a later stage for example.

In a further advantageous embodiment the heating device has at least one radiation source mounting and preferably at least two radiation source mountings, on which the at least one first radiation source, in particular one end of the radiation source (when viewed with respect to a longitudinal direction of the radiation source), is disposed. The reflector device can preferably be attached, preferably fitted or clipped on, (directly) onto the at least one radiation source mounting. In this way the reflector device can preferably be attached indirectly to the radiation source. Thus it would even be conceivable for the reflector device to be disposed on the radiation source in such a way that the reflector device preferably does not contact the radiation source but is merely connected indirectly by means of the radiation source mounting to the radiation source. Preferably, however, the reflector device can be attached to or is disposed on at least one radiation source mounting, so that it can be or is held thereby (in a stable manner) in a predetermined position, but nevertheless contacts the radiation source on at least some sections. Thus the reflector device or the reflector can preferably also be clipped onto the mountings on the ends of the radiation source instead of directly onto the radiation source itself.

Preferably both ends of the radiation source (when viewed with respect to a longitudinal direction of the radiation source) are disposed on at least one radiation source mounting and preferably each end is disposed respectively on a separate radiation source mounting. In this case a plurality of radiation sources or in particular ends thereof can advantageously be disposed on a radiation source mounting, preferably one above the other.

In a further advantageous embodiment the material of the support is radiation-permeable relative to at least a proportion of the thermal radiation provided for heating the plastic parisons. The reflection component is preferably located with respect to the support on the side facing the radiation source. Thus such an internal reflection component is even nearer to the radiation source. However, the reflection component can also be advantageously located with respect to the support on the side facing away from the radiation source. A reflection component located externally in such a way can be cooled more easily or can transmit the absorbed radiation better.

In a further advantageous embodiment the support is made of quartz glass or includes quartz glass. This material is characterised by a high heat resistance, which is advantageous for preserving the dimensional stability of the reflector device during heating thereof by absorbed radiation. Moreover, quartz glass is transparent with respect to infrared light, which ensures a high degree of radiation permeability.

In a further advantageous embodiment the reflection component is configured in such a way that it has an asymmetrical cross-section in a plane perpendicular to a longitudinal direction of the radiation source. An asymmetrical cross-section of a reflection component is understood to mean that the reflective surface of the reflection component attached to a radiation source in the plane perpendicular to a longitudinal direction of the radiation source is not axially symmetrical with respect to any straight line through the centre point of the radiation source.

Consequently a heating device in which a reflector device with a reflection component configured in such a way is attached to the radiation source has an asymmetrical emission characteristic in the plane perpendicular to a longitudinal direction of the radiation source. In this way it is possible to apply virtually no radiation to a region of the wall of a plastic parison and simultaneously to place a very high energy density in a region adjacent thereto. As mentioned in the introduction, such a characteristic is relevant in particular for heating the parisons in the mouth region of the plastic parisons. Whilst this region should be largely omitted from the application of radiation, the neck region located below the mouth region should be heated in the most defined manner possible in order to enable a neat neck extension. By an asymmetrical configuration of the reflection component a part of the reflection component can principally keep radiation away from a region of the plastic parison and thus can narrow the radiator field, whereas a further part of the reflection component principally directs radiation reflected in a targeted manner onto a further region of the plastic parison and substantially increases the energy density there.

The reflection component can preferably also be configured symmetrically in a plane perpendicular to a longitudinal direction of the radiation source and the support can be configured asymmetrically.

In a further advantageous embodiment the reflector device bears on at least two regions on the radiation source. The distance between the support and the radiation source is preferably constant, in particular in externally located reflection components. However, it may also be advantageous to provide a greater distance from the radiation source in at least one region of the support, in particular in the case of an internally located reflection component, and particularly preferably in precisely the region on which the internally located reflection component bears against the support.

Alternatively or in addition the radiation source itself can be made of quartz glass with a reflective coating and can have a corresponding cross-sectional profile. In this way the radiation source and the reflector device can be constructed in one piece. In this case the cross-sectional profile can advantageously be designed as in the described embodiments of the reflection components, in order to direct or to focus the reflected radiation in a targeted manner onto defined regions of the parison. In this case the cross-sectional profile of the radiation source and/or of the reflector device can be substantially V-shaped, W-shaped, U-shaped, star-shaped, triangular, rectangular, circular or polygonal and advantageously can additionally be provided with recesses. Combinations of these cross-sections are also conceivable.

In a further advantageous embodiment the heating device can have a second radiation source. This is preferably disposed offset with respect to the first radiation source in the longitudinal direction of the plastic parisons to be heated. Advantageously the second radiation source is also equipped with a reflector device according to the invention. In this case the particular embodiment may differ, in particular in the cross-sectional profile of the reflection component.

The support and the reflection component can advantageously also be configured in one piece, and for example in this case the reflection component can have a predetermined cross-section which deviates from a cross-section in the shape of a circular ring segment in a plane perpendicular to a longitudinal direction of the radiation source, or can have a cross-sectional profile described above.

In a further advantageous embodiment the apparatus according to the invention also has a cooling device for cooling the reflector device, particularly preferably in the case of an internally located reflection component, and/or has a cooling device for cooling the plastic parisons, in particular the mouth regions thereof. Such a cooling device is preferably an air and/or water cooling device. In addition a cooling device can also be provided which cools the surfaces of the plastic parisons, for example by application of cooling air thereto.

Furthermore the present invention is directed to a heating device for heating plastic parisons, wherein the heating device has at least one first radiation source which emits thermal radiation as well as at least one reflector device which reflects at least a proportion of the thermal radiation emitted by the radiation source. Furthermore the reflector device can be attached to the radiation source and has a support and a reflection component which bears against the support on at least one region and is suitable for reflection of the radiation.

In this case the heating device can be equipped with all the features described above in the context of the heating apparatus.

BRIEF DESCRIPTION OF THE DRAWINGS

Further advantages and embodiments are apparent from the appended drawings. In the drawings.

DETAILED DESCRIPTION OF THE INVENTION

Figure 1:
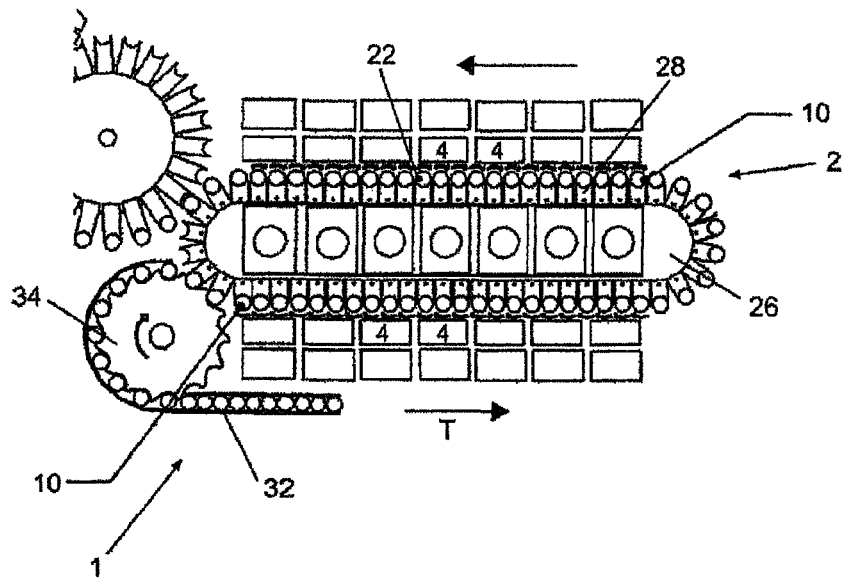
FIG. 1 shows an apparatus for heating plastic parisons.

FIG. 1 shows a schematic representation of an apparatus 1 according to the invention. In this case plastic parisons 10 are delivered by means of a delivery device 32 initially to a separating device 34, which for example may contain a sawtooth spider element, and are separated there. The separated plastic parisons 10 are then guided past heating devices 4 which are disposed laterally with respect to the transported plastic parisons 10 along the transport path T. In this case the reference sign 2 relates overall to a transport device which conveys the plastic parisons 10 on a transport path T. The reference sign 26 relates to a deflecting device, such as a deflecting wheel, around which the plastic parisons 10 are guided, in order then to be transported again section by section along straight paths on which the heating devices 4 are disposed. The reference numeral 22 designates a rotary device for rotating the plastic parisons 10 about their own longitudinal axis. The reference numeral 28 relates to holding devices for holding the plastic parisons. These holding devices can have mandrels which engage in the mouths of the plastic parisons.

Figure 2A:
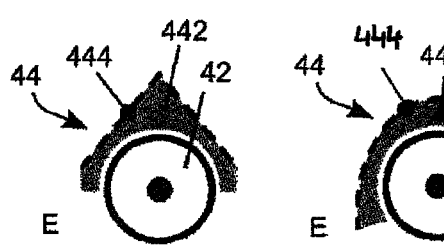
FIGS. 2a-c show three cross-sectional representations of a reflector device according to the invention attached to a radiation source.
Figure 2B:
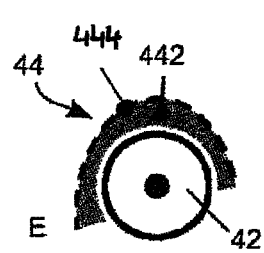
Figure 2C:
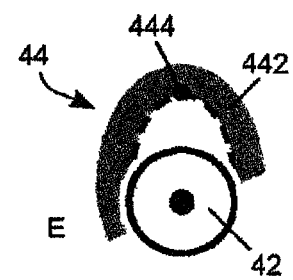

FIGS. 2a-2c show cross-sections of a reflector device 44 according to the invention which is mounted on a radiation source 42 in each case in different embodiments. In this case the illustrated radiation source 42 extends in its longitudinal direction L perpendicular to the drawing plane. Thus the illustrated cross-sectional plane, i.e. the drawing plane, corresponds to a plane E perpendicular to the longitudinal direction L of the radiation source 42.

The reflector device 44 has a support 442 as well as a reflection component 444 bearing on the support 442. In this case the support 442 can be disposed with respect to the reflection component 444 both on the side facing the radiation source 42 (see FIGS. 2a and 2b) and also on the side facing away from the radiation source 42 (see FIG. 2c). In the two first embodiments the radiation emitted by the radiation source 42 in the direction of the reflector device 44 initially penetrates the support 442 which is transparent for at least a part of the emission spectrum and is then reflected on the reflection component 444 in the direction of the plastic parison 10.

By comparison with reflector devices according to the prior art which are distanced from the radiation source 42, the reflector devices 44 according to the invention are characterised, on the basis of their small distance from the radiation source 42, by a very narrow embodiment. Moreover, in spite of this very narrow embodiment there is nevertheless a sufficient freedom of design for a configuration of the cross-sectional profile which is adapted so as to be application-specific, so that it is preferable to the coated radiation sources according to the prior art (with predetermined circular or elliptical cross-sectional profile) for a specific direction and/or focusing of the reflected radiation and thus with regard to a specific design of the radiation field.

FIG. 2a shows a reflector device 44 according to the invention of which the reflection component 444 has planar surfaces section by section which correspond in their cross-sectional representation to a configuration which is straight section by section. The reflector device 44 illustrated in FIG. 2b is equipped with a reflection component 444 having an asymmetrical cross-section. A further embodiment of a reflector device 44 according to the invention is characterised by a largely elliptical or parabolic configuration of the reflection component 444 and is shown in FIG. 2c.

Figure 3:
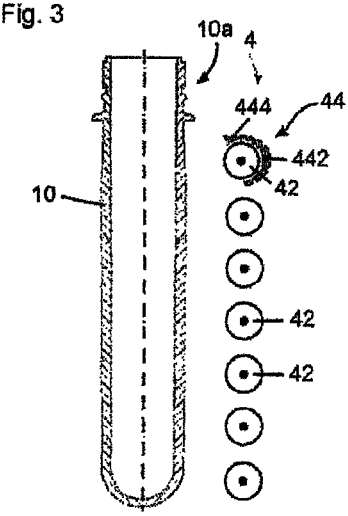
FIG. 3 shows a cross-sectional representation of an advantageous possible use of the reflector device according to FIG. 2b.

FIG. 3 illustrates an advantageous possible use of the reflector device 44 according to FIG. 2b. In addition to a radiation source 42 with this reflector device 44, the depicted heating device 4 contains a plurality of further radiation sources 42 which can likewise be equipped with reflector devices 44 according to the invention. In order as far as possible to be able to prevent the radiation emitted by the nearest radiation source 42 from being applied directly to the mouth region 10a of the plastic parison 10, the upper part of the reflection component 444 according to the invention onwards can be drawn further over the radiation source 42 than for example the lower part of the reflection component 444.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

The invention claimed is:

1. An apparatus for heating plastic parisons, said apparatus comprising a transport device which transports the plastic parisons along a predetermined transport path, and with at least one heating device, wherein the heating device has at least one first radiation source which emits thermal radiation as well as at least one reflector device which reflects at least a proportion of the thermal radiation emitted by the radiation source in a direction of the plastic parisons in the transport path, wherein the reflector device is mounted directly on the radiation source which is disposed at a focal point of the reflection device, wherein a surface of the reflector device facing the radiation source follows a parabolically curved path at least in sections.

2. The apparatus according to claim 1, wherein the reflector device has a predetermined cross-section which deviates from a cross-section in a shape of a circular ring segment in a plane perpendicular to a longitudinal direction of the radiation source.

3. The apparatus according to claim 1, wherein a surface of the reflector device facing the radiation source follows an elliptically curved configuration at least in sections.

4. The apparatus according to claim 1, wherein the reflector device is pushed laterally onto the radiation source in a longitudinal direction of the radiation source or is fitted on or adhered to the radiation source perpendicular to the longitudinal direction of the radiation source.

5. The apparatus according to claim 1, wherein the heating device has at least one radiation source mounting on which the at least one first radiation source is disposed.

6. The apparatus according to claim 5, wherein the reflector device is also attached to, fitted on or clipped onto an at least one radiation source mounting.

7. The apparatus according to claim 6, wherein the material of the at least one radiation source mounting is radiation-permeable relative to at least a proportion of the thermal radiation provided for heating the plastic parisons.

8. The apparatus according to claim 1, wherein at least one radiation source mounting is made of quartz glass.

9. The apparatus according to claim 1, wherein the reflector device bears against the radiation source at at least two regions.

10. The apparatus according to claim 1, wherein the heating device has at least one radiation source mounting on which one end of the radiation source is disposed.

11. The apparatus according to claim 10, wherein the reflector device is also attached to, fitted on or clipped onto an at least one radiation source mounting.

12. The apparatus according to claim 11, wherein the reflector device and the support are formed of different materials.

13. The apparatus according to claim 1, wherein the support has a reflective coating on at least one region of the support.

14. The apparatus according to claim 13, wherein the reflective coating comprises a gold and/or ceramic treated surface, or a polished surface.

15. An apparatus for heating plastic parisons, said apparatus comprising a transport device which transports the plastic parisons along a predetermined transport path, and with at least one heating device, wherein the heating device has at least one first radiation source which emits thermal radiation as well as at least one reflector device which reflects at least a proportion of the thermal radiation emitted by the radiation source in a direction of the plastic parisons in the transport path, wherein the reflector device is mounted directly on the radiation source which is disposed at a focal point of the reflector device, wherein the reflector device has an asymmetrical cross-section in a plane perpendicular to a longitudinal direction of the radiation source.

16. A heating device for heating plastic parisons, said heating device comprising at least one first radiation source which emits thermal radiation as well as at least one reflector device which reflects at least a proportion of the thermal radiation emitted by the radiation source, wherein the reflector device is attached directly to at least one contact region of the radiation source which is disposed in a focal point of the reflector device, and wherein the reflector device has planar surfaces sections which are configured in a straight line.

* * * * *